(12) United States Patent
Laarman et al.

(10) Patent No.: US 10,441,079 B2
(45) Date of Patent: Oct. 15, 2019

(54) HEIGHT ADJUSTABLE STANCHION

(71) Applicant: Herman Miller, Inc., Zeeland, MI (US)

(72) Inventors: Jeremy Laarman, Zeeland, MI (US);
Michael Katje, Grand Haven, MI (US);
Anthony Sall, Grandville, MI (US)

(73) Assignee: HERMAN MILLER, INC., Zeeland, MI (US)

( * ) Notice: Subject to any disclaimer, the term of this patent is extended or adjusted under 35 U.S.C. 154(b) by 155 days.

(21) Appl. No.: 15/618,348

(22) Filed: Jun. 9, 2017

(65) Prior Publication Data

US 2017/0354253 A1 Dec. 14, 2017

Related U.S. Application Data

(60) Provisional application No. 62/348,268, filed on Jun. 10, 2016.

(51) Int. Cl.
*F16M 11/24* (2006.01)
*A47B 96/07* (2006.01)

(52) U.S. Cl.
CPC ............. *A47B 96/07* (2013.01); *F16M 11/24* (2013.01)

(58) Field of Classification Search
CPC ................................. A47B 96/07; F16M 11/24
USPC ................. 248/188.4; 108/39, 41, 51.11
See application file for complete search history.

(56) References Cited

U.S. PATENT DOCUMENTS

| | | | |
|---|---|---|---|
| 7,240,380 B2 | 7/2007 | Erickson | |
| 7,246,387 B2 * | 7/2007 | Erickson | A47B 77/06 4/631 |
| 7,293,667 B2 * | 11/2007 | Flynn | A47B 57/565 211/187 |
| 7,938,372 B2 * | 5/2011 | MacLeod | A47B 21/00 108/10 |
| 8,910,805 B2 | 12/2014 | Gregory et al. | |
| 8,967,054 B2 | 3/2015 | Henriott et al. | |
| 9,101,213 B2 * | 8/2015 | McGregor | A47B 88/407 |
| 2005/0247239 A1 | 11/2005 | Newhouse et al. | |
| 2006/0278770 A1 | 12/2006 | MacLeod | |
| 2012/0304900 A1 | 12/2012 | Henriott et al. | |
| 2013/0032560 A1 | 2/2013 | Gregory et al. | |

(Continued)

FOREIGN PATENT DOCUMENTS

| | | |
|---|---|---|
| EP | 0692207 A1 | 1/1996 |
| EP | 1336360 A2 | 8/2003 |

(Continued)

*Primary Examiner* — Todd M Epps
(74) *Attorney, Agent, or Firm* — Michael Best & Friedrich LLP

(57) ABSTRACT

A stanchion for supporting a structure includes a bracket configured to be coupled to the structure, a threaded rod coupled to and extending from the bracket, and a housing having a first end adjacent the bracket, a second end opposite the first end, and an engagement member positioned within the housing between the first end and the second end. The engagement member has threads that engage the threaded rod. The stanchion also includes a connection body extending from the first end of the housing and engaging the bracket to selectively inhibit rotation of the housing about the threaded rod. The housing is rotatable about the threaded rod to temporarily deflect the connection body away from the bracket and adjust a length of the stanchion.

20 Claims, 5 Drawing Sheets

(56) References Cited

U.S. PATENT DOCUMENTS

2014/0373360 A1  12/2014  Candler et al.
2015/0147008 A1   5/2015  McGregor

FOREIGN PATENT DOCUMENTS

WO      02102189 A2  12/2002
WO    2004045347 A2   6/2004

* cited by examiner

HEIGHT ADJUSTABLE STANCHION

CROSS-REFERENCE TO RELATED APPLICATIONS

This application claims priority to U.S. Provisional Patent Application No. 62/348,268, filed Jun. 10, 2016, the entire contents of which are incorporated by reference herein.

BACKGROUND

The present invention relates to stanchions, and more particularly, to stanchions for elevating a storage structure above a first structure.

SUMMARY

In one embodiment, the invention provides a stanchion for supporting a structure. The stanchion includes a bracket configured to be coupled to the structure, a threaded rod coupled to and extending from the bracket, and a housing having a first end adjacent the bracket, a second end opposite the first end, and an engagement member positioned within the housing between the first end and the second end. The engagement member has threads that engage the threaded rod. The stanchion also includes a connection body extending from the first end of the housing and engaging the bracket to selectively inhibit rotation of the housing about the threaded rod. The housing is rotatable about the threaded rod to temporarily deflect the connection body away from the bracket and adjust a length of the stanchion.

In another embodiment, the invention provides a system including a first structure having an upper surface, a second structure positioned above the upper surface of the first structure, and a stanchion for supporting the second structure. The stanchion includes a bracket coupled to the second structure, a threaded rod coupled to and extending from the bracket, and a housing having a first end adjacent the bracket, a second end opposite the first end and adjacent the upper surface of the first structure, and an engagement member positioned within the housing between the first end and the second end. The engagement member has threads that engage the threaded rod. The stanchion also includes a connection body extending from the first end of the housing and engaging the bracket to selectively inhibit rotation of the housing about the threaded rod. The housing is rotatable about the threaded rod to temporarily deflect the connection body away from the bracket and adjust a length of the stanchion.

In yet another embodiment, the invention provides a method of adjusting a stanchion positioned between a first structure and a second structure. The stanchion includes a bracket, a threaded rod coupled to and extending from the bracket, a housing having an engagement member with threads that engage the threaded rod, and a connection body extending from the housing and engaging the bracket to selectively inhibit rotation of the housing about the threaded rod. The method includes positioning the housing on an upper surface of the first structure, coupling the bracket to the second structure, and rotating the housing about the threaded rod. The method also includes temporarily deflecting the connection body away from the bracket as the housing is rotated, and adjusting a length of the stanchion as the housing is rotated.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
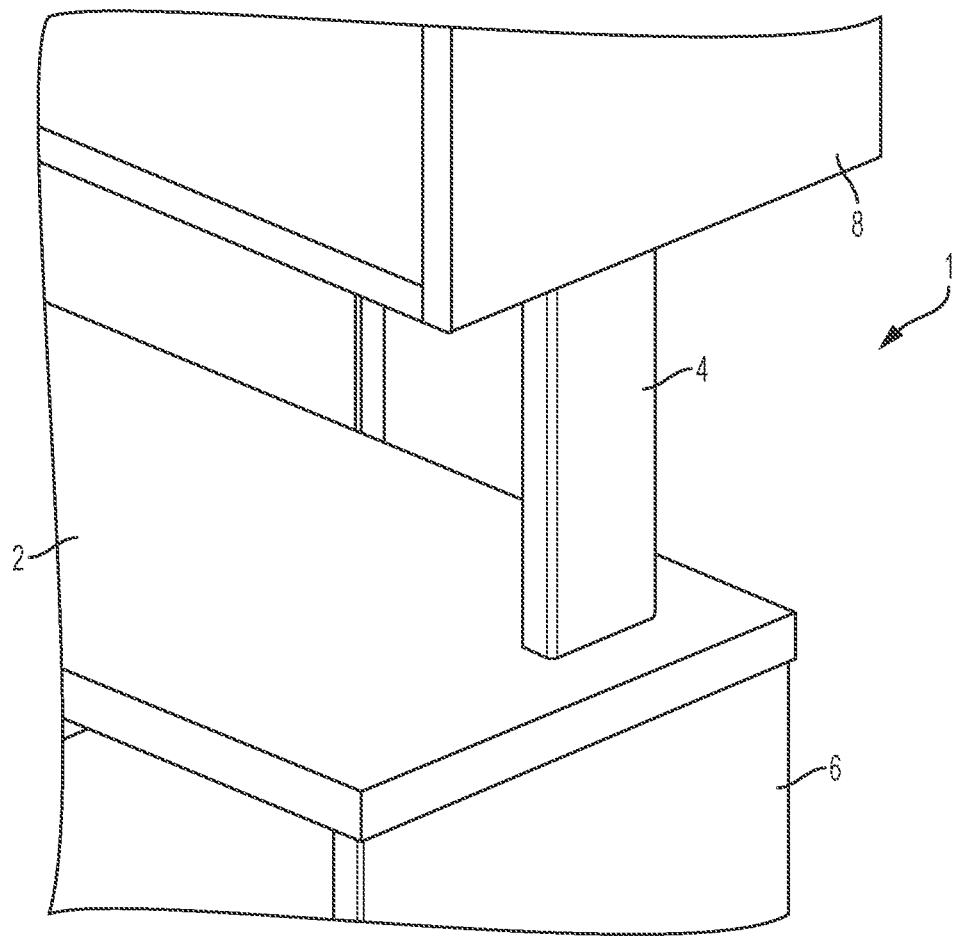
FIG. 1 is a perspective view of a stanchion arranged between two structures.

FIG. 1 illustrates a system 1, such as a workplace storage assembly, including a stanchion 4 positioned between two structures 6, 8. The first structure 6 may be, for example, a table, desk, cabinet, or other type of workplace unit. In some embodiments, the first structure 6 may be the floor. The second structure 8 may be, for example, a cabinet or shelf positioned above the first structure 6. The stanchion 4 is configured to support and elevate the second structure 8 above an upper surface 2 of the first structure 6. The stanchion 4 is also adjustable (more particularly, adjustable in length) to adjust the height and/or levelling of the second structure 8 relative to the first structure 6.

As shown in FIGS. 2-5, the illustrated stanchion 4 includes a bracket 12, a threaded rod 20, a housing 16, and a connection body 28. The bracket 12 is configured to be coupled to the second structure 8. In the illustrated embodiment, the bracket 12 is a relatively thin plate and is generally rectangular-shaped. In other embodiments, the bracket 12 may have other desired thicknesses and other desired shapes, such as triangular, square, and the like, in which the bracket is configured to be coupled to the second structure 8.

Figure 4:
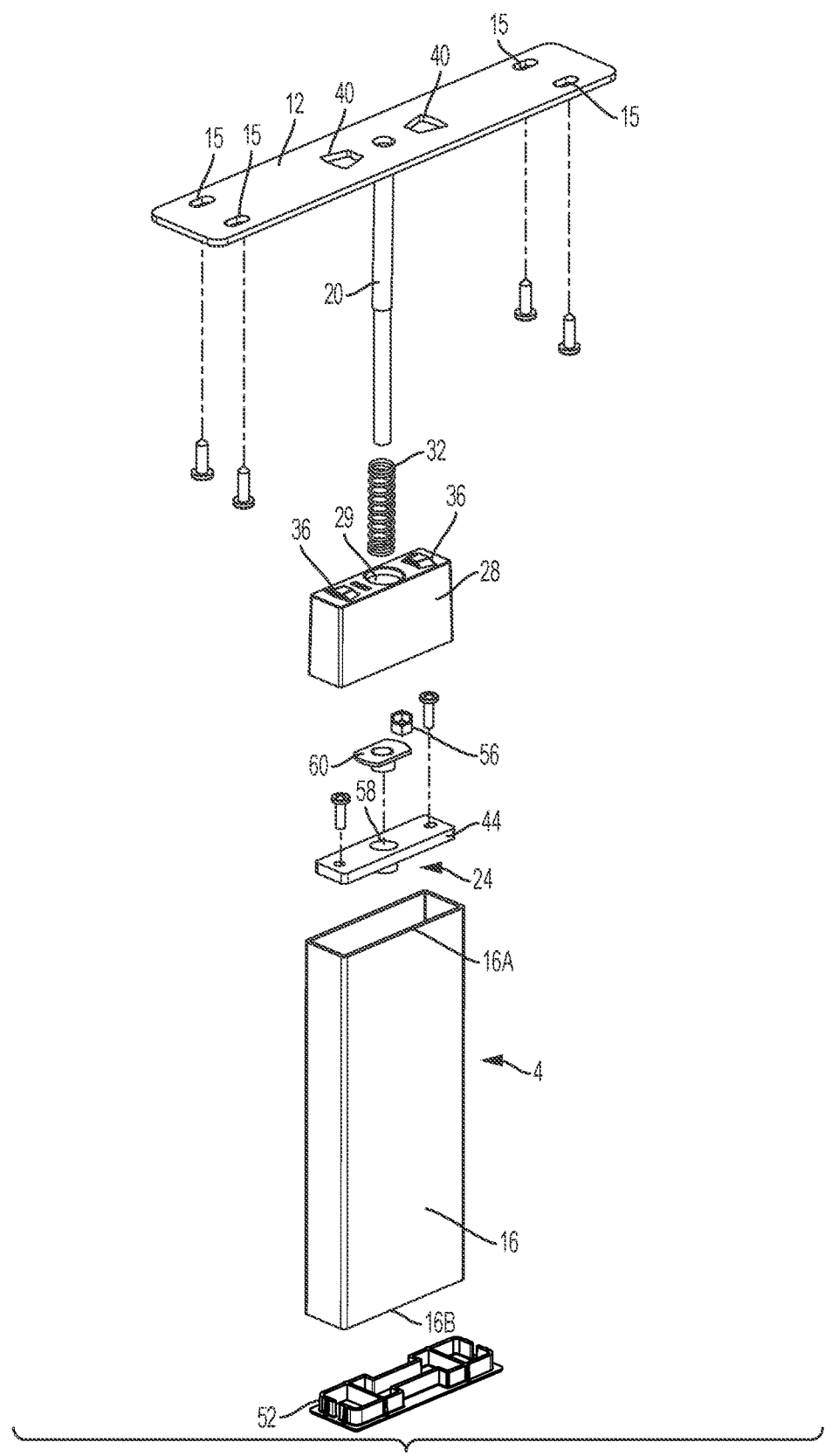
FIG. 4 is an exploded view of the stanchion of FIG. 2.

In the illustrated embodiment, the bracket 12 is coupled to the second structure 8 by four fasteners 14 (e.g., screws). In other embodiments, the bracket 12 may be coupled to the second structure 8 by two or more fasteners or by other means to secure the bracket 12 to the second structure 8. The fasteners 14 extend through the openings 15, as shown in FIG. 4, formed on the bracket 12. In the illustrated embodiment, two openings of the openings 15 are positioned near one end of the bracket 12 and the other two openings of the openings 15 are positioned at the opposite end of the bracket 12. In other embodiments, the bracket 12 may include fewer or more openings 15 and fasteners 14. For example, the bracket 12 may include two openings 15, where one opening is positioned at one end of the bracket 12 and the other opening is positioned at the opposite end of the bracket 12.

The illustrated bracket 12 also includes two recesses 40 positioned between the openings 15 and the threaded rod 20, where one recess of the two recesses 40 is positioned generally between one set of the openings 15 and the threaded rod 20 and the other recess of the two recesses 40 is positioned generally between the other set of the openings 15 and the threaded rod 20. In other embodiments, the openings 15 may be positioned between the recesses 40 and the threaded rod 20. The recesses 40 selectively receive portions of the connection body 28, as further discussed below.

Figure 5:
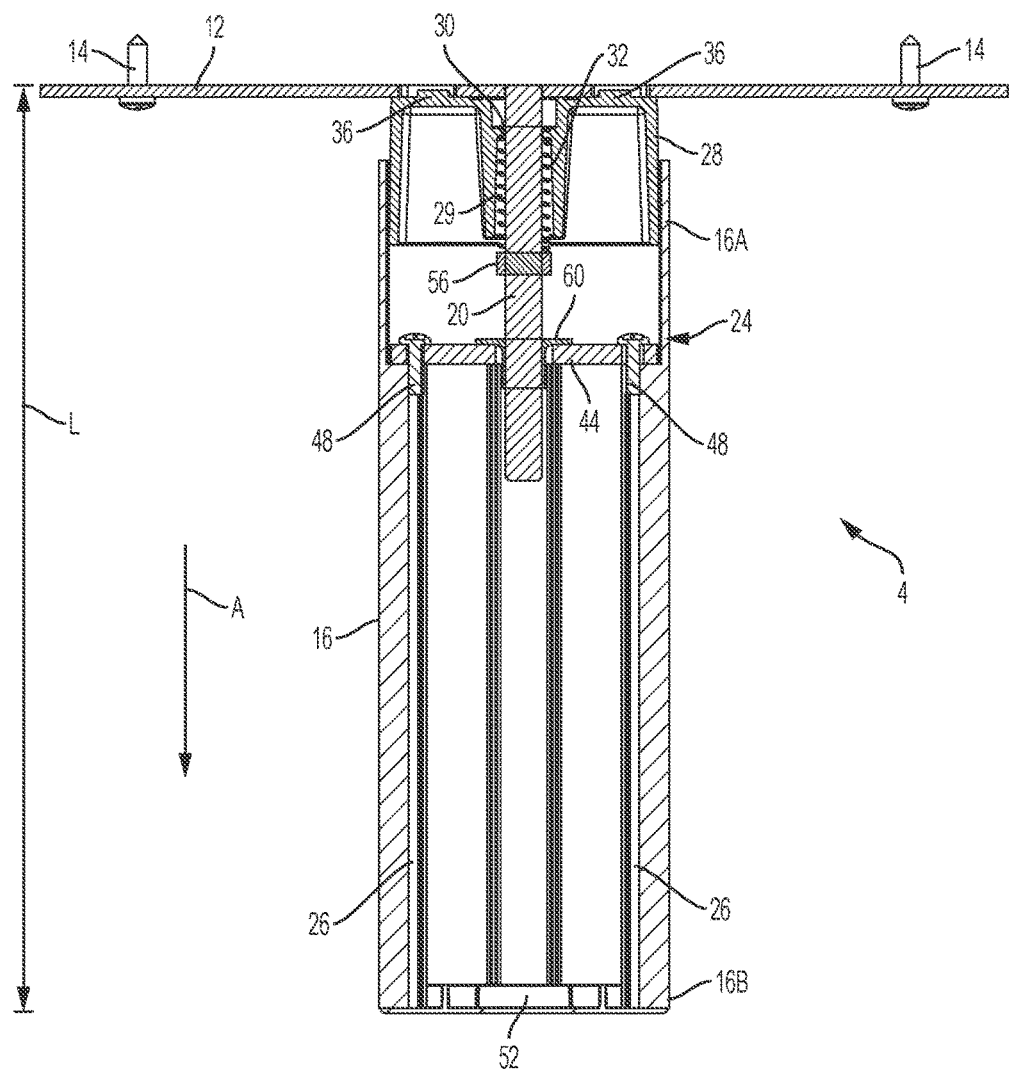
FIG. 5 is a cross-sectional view of the stanchion taken through section line 5-5 of FIG. 2.

The threaded rod 20 is coupled to a central portion of the bracket 12, as shown in FIG. 5. The threaded rod 20 extends from the bracket 12 and into the housing 16. In some embodiments, the threaded rod 20 may be permanently fixed (e.g., brazed or welded) to the bracket 12. The illustrated threaded rod 20 includes a flange 56 located on an intermediate portion of the threaded rod 20, as shown in FIG. 5. The flange 56 is generally positioned between the connection body 28 and an engagement member 24, as further discussed below. In the illustrated embodiment, the flange 56 is a nut that is threaded onto the threaded rod 20. In other embodiments, the flange 56 may be a shoulder that is integrally formed or fixed to the threaded rod 20.

The housing 16 includes a first end 16A and a second end 16B opposite the first end 16A. The first end 16A of the housing 16 is positioned adjacent to the bracket 12, and the second end 16B of the housing 16 is configured to engage (e.g., rest on) the upper surface 2 of the first structure 6 (FIG. 1). In the illustrated embodiment, the housing 16 has a generally rectangular cross-section and is generally hollow. In other embodiments, the housing 16 may have other shapes or configurations, depending on the desired appearance of the stanchion 4.

As shown in FIGS. 4 and 5, the housing 16 includes the engagement member 24 generally positioned between the first end 16A and the second end 16B. In the illustrated embodiment, the engagement member 24 includes an intermediate plate 44 and a weld nut 60, as shown in FIG. 4. The intermediate plate 44 and the weld nut 60 define an aperture 58 that receives the threaded rod 20. The weld nut 60 is secured (e.g., welded, brazed, etc.) to the intermediate plate 44. The weld nut 60 also has inner threads 60 that threadably engage the threaded rod 20. As shown in FIG. 5, the intermediate plate 44 is supported within the housing 16 on bosses 26 extending above the second end 16B of the housing 16. The intermediate plate 44 is secured to the bosses 26 by threaded fasteners 48 (e.g., screws). In other embodiments, the intermediate plate 44 may be secured to the bosses 26 by bolts or other fastening means. The bosses 26, the engagement member 24, and the threaded rod 20 form a rigid structure between the second end 16B of the housing 16 and the bracket 12 to rigidly support the second structure 8 above the first structure 6 (FIG. 1).

With continued reference to FIGS. 4 and 5, the connection body 28 extends from the first end 16A of the housing 16 and engages the bracket 12. The connection body 28 has a slightly smaller cross-sectional area than the housing 16 such that the connection body 28 is partially received within the housing 16, as shown in FIG. 5. In the illustrated embodiment, the connection body 28 includes two detents 36, or projections, formed on an upper surface of the connection body 28 (i.e., the surface facing the bracket 12). The detents 36 are selectively received in the recesses 40 of the bracket 12 to inhibit rotation of the connection body 28 and the housing 16 relative to the bracket 12. In other embodiments, the bracket 12 may include the detents, and the connection body 28 may have the recesses. Furthermore, in the illustrated embodiment, the connection body 28 includes a recess 29 formed generally in the central portion of the connection body 28, as further discussed below.

As shown in FIG. 5, the stanchion 4 also includes a spring 32 positioned around a section of the threaded rod 20 between the bracket 12 and the engagement member 24. In particular, the spring 32 is partially received within the recess 29 formed in the connection body 28, and is captured between the flange 56 of the threaded rod 20 and a surface 30 of the connection body 28 that defines the recess 29. The spring 32 biases the connection body 28 (and, thereby, the housing 16) toward the bracket 12.

The illustrated stanchion 4 further includes a pad 52 coupled to the second end 16B of the housing 16, as shown in FIG. 4. The pad 52 can be made from a plastic and/or elastomeric material and is configured to create friction between the upper surface 2 of the first structure 6 and the stanchion 4. The pad 52 also helps inhibit marring or otherwise scuffing of the upper surface 2 of the first structure 6 (FIG. 1). In some embodiments, the pad 52 is snap-fit into the second end 16B of the housing 16. In other embodiments, glue, or any other suitable fastener, may be used to secure the pad 52 to the second end 16B of the housing 16.

Referring to FIG. 5, a length L of the stanchion 4 is adjustable to change the height at which the second structure 8 is supported above the first structure 6. In the illustrated embodiment, the housing 16 is rotatable about the threaded rod 20 to adjust the length L. For example, when in a first or resting position, as shown in FIG. 5, the spring 32 biases the connection body 28 into engagement with the bracket 12 so that the detents 36 formed on the upper surface of the connection body 28 are received in the recesses 40 on the bracket 12. In this position, the detents 36 provide a retention force that inhibits unintentional rotation of the connection body 28 and the housing 16 about the threaded rod 20.

Figure 3:
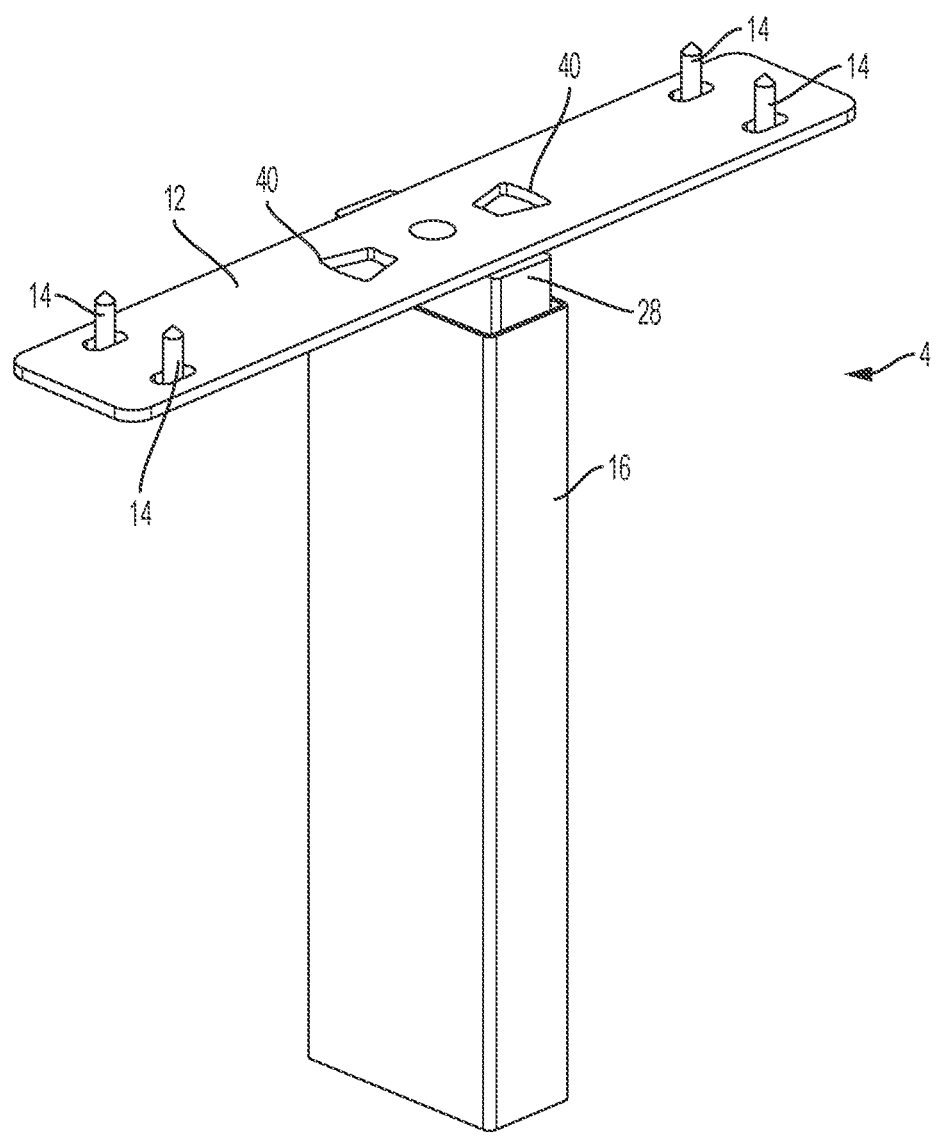
FIG. 3 is another perspective view of the stanchion shown in FIG. 1 rotated to a second position.

To adjust the length L of the stanchion 4, the housing 16 is rotated with sufficient force to overcome the retention force of the detents 36 so that the detents 36 temporarily move (e.g., deflect) out of the recesses 40, as shown in FIG. 3. The ramped shapes of the detents 36 cause the connection body 28 to move further into the housing 16 (e.g., downward) against the bias of the spring 32 (i.e., in the direction of arrow A). To help with this deflection, the second structure 8 that is coupled to the bracket 12 may be lifted slightly upward relative to the first structure 6 to relieve pressure on the stanchion 4. When in a second or moving position (FIG. 3), the detents 36 are temporarily moved out of the recesses 40 of the bracket 12 such that rotation of the connection body 28 and the housing 16 is no longer inhibited. Furthermore, the connection body 28 and the housing 16 are rotatable about the threaded rod 20 relative to the bracket 12. Accordingly, the length L of the stanchion 4 can be increased or decreased as the connection body 28 and the housing 16 continues to be rotated about the threaded rod 20, relative to the bracket 12.

During rotation, the bracket 12 and the threaded rod 20 (and, thereby, the second structure 8) remain stationary and the engagement member 24, positioned in the housing 16, threads upward or downward along the threaded rod 20 (depending on the direction of rotation). After each half-turn (i.e., after turning the housing 16 180° relative to the bracket 12), the detents 36 snap back into the recesses 40 under the bias of the spring 32. A user may continue to rotate the housing 16 (in half-turn increments) in either direction until the stanchion 4 reaches a desired length.

Figure 2:
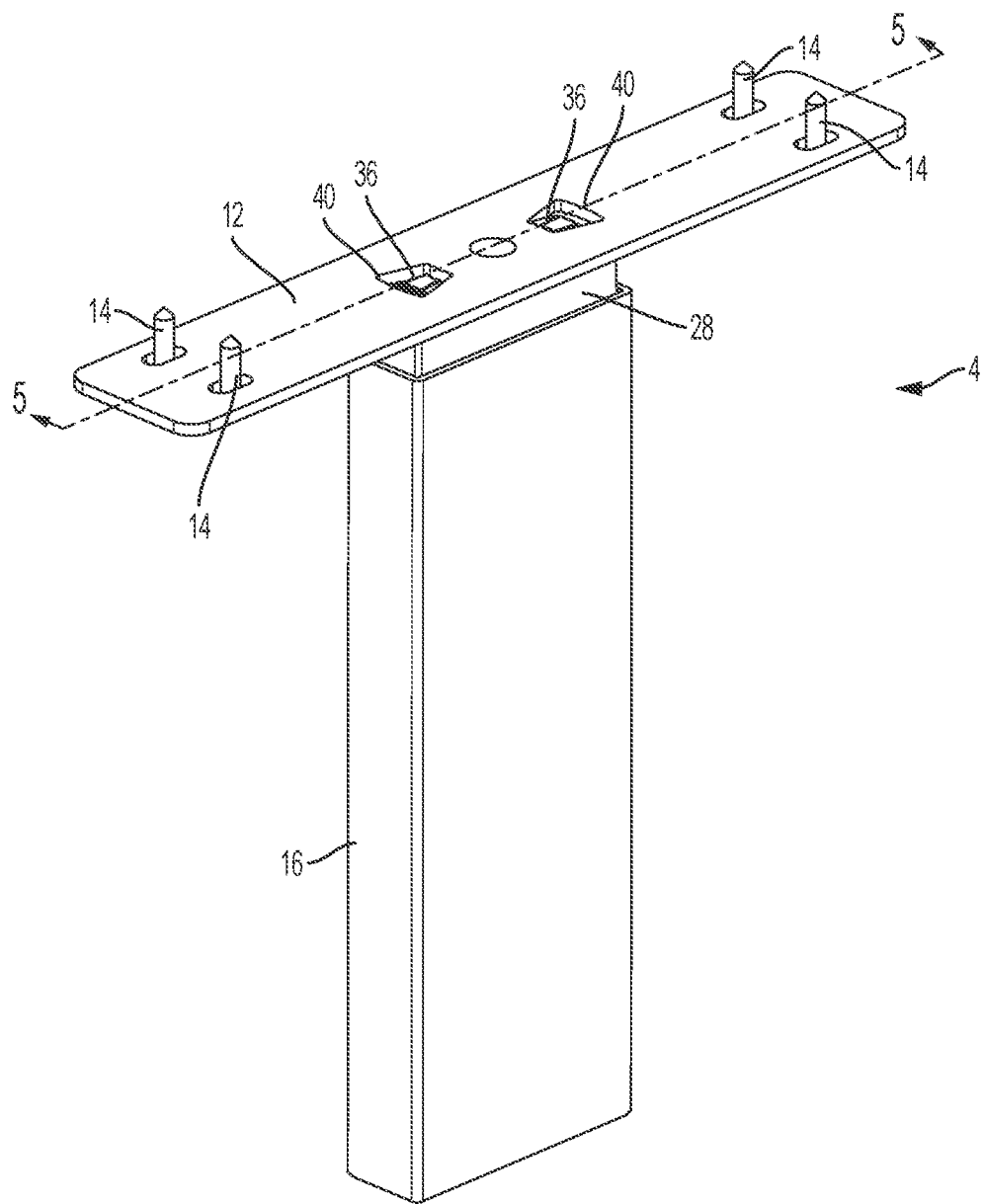
FIG. 2 is a perspective view of the stanchion shown in FIG. 1 while in a first position.

As shown in FIG. 2, the housing 16 of the stanchion 4 is in the first or resting position where the detents 36 are received in the recesses 40 of the bracket 12 and the housing 16 may not be unintentionally rotated. As shown in FIG. 3, the housing 16 of the stanchion 4 is in the second or moving position where the detents 36 are temporarily deflected out of the recesses 40 and the housing 16 may be rotated (e.g. the housing 16 is rotated 90° relative to the bracket 12) so that the length L of the stanchion 4 is adjustable.

The user may adjust the length L of the stanchion 4 to a desired length where the second structure 8 is positioned at a desired height relative to the first structure 6. The user may also adjust the length L of the stanchion 4 to level the second structure 8 relative to the first structure 6. In the illustrated embodiment, the second structure 8 is positioned above the first structure 6 and supported by the stanchion 4. In other embodiments, two or more stanchions may be used to support the second structure 8 above the first structure 6. Furthermore, the length L of each stanchion 4 is adjustable where the second structure 8 may be levelled relative to the first structure 6 by adjusting the length L of one or more of the stanchions supporting the second structure 8.

Although the invention has been described with reference to certain preferred embodiments, variations and modifications exist within the scope and spirit of one or more independent aspects of the invention. Various features and advantages of the invention are set forth in the following claims.

What is claimed is:

1. A stanchion for supporting a structure, the stanchion comprising:
   a bracket configured to be coupled to the structure;
   a threaded rod coupled to and extended from the bracket;
   a housing including a first end adjacent the bracket, a second end opposite the first end, and an engagement member positioned within the housing between the first end and the second end, the engagement member having threads that engage the threaded rod; and
   a connection body that extends from the first end of the housing and engages the bracket to selectively inhibit rotation of the housing about the threaded rod,
   wherein the housing is rotatable about the threaded rod to temporarily deflect the connection body away from the bracket and adjust a length of the stanchion.

2. The stanchion of claim 1, further comprising a spring positioned around a section of the threaded rod between the connection body and the engagement member, wherein the spring biases the connection body into engagement with the bracket.

3. The stanchion of claim 2, wherein the spring is partially received within a recess formed in the connection body and abuts a surface that defines the recess.

4. The stanchion of claim 3, wherein the threaded rod includes a flange, and wherein the spring is captured between the flange of the threaded rod and the surface of the connection body.

5. The stanchion of claim 2, wherein the connection body and the housing are movable linearly away from the bracket against a bias of the spring.

6. The stanchion of claim 1, wherein one of the bracket or the connection body includes a detent, wherein the another of the bracket or the connection body includes a recess, and wherein the detent is received in the recess when the connection body engages the bracket to inhibit rotation of the housing about the threaded rod.

7. The stanchion of claim 1, wherein the engagement member includes an intermediate plate and a weld nut supported within an interior of the housing above the second end of the housing.

8. The stanchion of claim 7, wherein the intermediate plate is secured to the housing by threaded fasteners.

9. The stanchion of claim 1, further comprising a pad coupled to the second end of the housing.

10. A system comprising:
    a first structure including an upper surface;
    a second structure positioned above the upper surface of the first structure; and
    a stanchion for supporting the second structure, the stanchion including
       a bracket coupled to the second structure,
       a threaded rod coupled to and extended from the bracket,
       a housing including a first end adjacent the bracket, a second end opposite the first end and adjacent the upper surface of the first structure, and an engagement member positioned within the housing between the first end and the second end, the engagement member having threads that engage the threaded rod, and
       a connection body that extends from the first end of the housing and engages the bracket to selectively inhibit rotation of the housing about the threaded rod,
       wherein the housing is rotatable about the threaded rod to temporarily deflect the connection body away from the bracket and adjust a length of the stanchion.

11. The system of claim 10, wherein the stanchion includes a spring positioned around a section of the threaded rod between the connection body and the engagement member, and wherein the spring biases the connection body into engagement with the bracket.

12. The system of claim 11, wherein the spring is partially received within a recess formed in the connection body and abuts a surface that defines the recess.

13. The system of claim 12, wherein the threaded rod includes a flange, and wherein the spring is captured between the flange of the threaded rod and the surface of the connection body.

14. The system of claim 11, wherein the connection body and the housing are movable linearly away from the bracket against a bias of the spring.

15. The system of claim 10, wherein one of the bracket or the connection body includes a detent, wherein another of the bracket or the connection body includes a recess, and wherein the detent is received in the recess when the connection body engages the bracket to inhibit rotation of the housing about the threaded rod.

16. The system of claim 10, wherein the engagement member includes an intermediate plate and a weld nut supported within an interior of the housing above the second end of the housing.

17. The system of claim 16, wherein the intermediate plate is secured to the housing by threaded fasteners.

18. The system of claim 10, further comprising a pad coupled to the second end of the housing, wherein the pad contacts the upper surface of the first structure.

19. A method of adjusting a stanchion positioned between a first structure and a second structure, the stanchion including a bracket, a threaded rod coupled to and extending from the bracket, a housing having an engagement member with threads that engage the threaded rod, and a connection body extending from the housing and engaging the bracket to selectively inhibit rotation of the housing about the threaded rod, the method comprising:
    positioning the housing on an upper surface of the first structure;
    coupling the bracket to the second structure;
    rotating the housing about the threaded rod;
    temporarily deflecting the connection body away from the bracket as the housing is rotated; and
    adjusting a length of the stanchion as the housing is rotated.

20. The method of claim 19, further comprising lifting the second structure relative to the first structure to relieve pressure on the stanchion.

\* \* \* \* \*